(12) United States Patent
Schultz et al.

(10) Patent No.: US 6,285,813 B1
(45) Date of Patent: Sep. 4, 2001

(54) DIFFRACTIVE GRATING COUPLER AND METHOD

(75) Inventors: Stephen M. Schultz, Marietta; Thomas K. Gaylord; Elias N. Glytsis, both of Atlanta; Nile F. Hartman, Stone Mountain, all of GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/165,822

(22) Filed: Oct. 2, 1998

Related U.S. Application Data
(60) Provisional application No. 60/060,774, filed on Oct. 3, 1997.

(51) Int. Cl.[7] .................................................. G02B 6/34
(52) U.S. Cl. .............................. 385/37; 359/575; 385/14
(58) Field of Search ................................ 385/15, 31, 37, 385/14; 359/34, 566, 574, 575

(56) References Cited

U.S. PATENT DOCUMENTS

| | | | |
|---|---|---|---|
| 4,978,187 | * 12/1990 | Minemura et al. | 385/14 |
| 5,009,484 | * 4/1991 | Gerritsen | 359/569 |
| 5,033,812 | 7/1991 | Yoshida et al. | 350/96.19 |
| 5,101,459 | 3/1992 | Sunagawa | 385/37 |
| 5,436,991 | 7/1995 | Sunagawa et al. | 385/37 |
| 5,469,518 | 11/1995 | Song et al. | 385/89 |

OTHER PUBLICATIONS

Huang et al., "Holographic Bragg grating input–output couplers for polymer waveguides at an 850–nm wavelength", Applied Optics, vol. 36, No. 6, pp. 1198–1203, Feb. 1997.*

Oh et al., "Integrated–Optic Focal–Spot Intensity Modulator Using Electrooptic Polymer Waveguide", Journal of Lightwave Technology, vol. 12, No. 9, pp. 1569–1576, Sep. 1994.*

Waldhausl et al., "Efficient focusing polymer waveguide grating couplers", Electronics Letters, vol. 33, pp. 623–624, Mar. 1997.*

Schultz, et al., "Design of a High–Efficiency Volume Grating Coupler Coupler for Line Focusing," Applied Optics, vol. 37, pp. 2278–2287, Apr. 1998.

W. Driemeier, "Bragg–Effect Grating Couplers Integrated in Multicomponent Polymeric Waveguides," Optics Letters, vol. 15, pp. 725–727, Jul. 1, 1990.

Huang, et al., "Holographic Bragg Grating Input–Output Couplers for Polymer Waveguides at 850–nm Wavelength," Applied Optics, vol. 36, pp. 1198–1203, Feb. 1997.

*Primary Examiner*—Brian Healy
*Assistant Examiner*—Michelle R. Connelly-Cushwa
(74) *Attorney, Agent, or Firm*—Thomas, Kayden, Horstemeyer & Risley (List continued on next page.)

(57) ABSTRACT

The present invention entails a volume grating for use as an optical coupler and method for creating the same which comprises a predetermined surface grating pattern having a decreasing surface grating period along a waveguide light propagation direction in the volume grating with a plurality of slanted grating fringes having a variable slant angle along the waveguide light propagation direction to focus coupled light in a first dimension with a predetermined light intensity profile along a grating-cover interface plane of the volume grating. In addition, the predetermined surface grating pattern further includes an increasing radius of curvature along the waveguide light propagation direction to focus the light in a second dimension. The present invention further comprises a system and method for designing the volume grating, as well as a system and method for designing an apparatus for fabricating the volume grating.

52 Claims, 13 Drawing Sheets

OTHER PUBLICATIONS

Jones, et al., "Rectangular Characteristic Gratings for Waveguide Input and Output Coupling," Applied Optics, vol. 34, pp. 4149–4158, Jul. 10, 1995.

Weiss, et al., "Coupling and Waveguiding in Photopolymers," in Proc. SPIE, vol. 3132, pp. 136–143, 1997.

Larrson, et al., "Grating Coupled Surface Emitters with Enhanced Surface Emission Efficiency," in Proc SPIE, vol. 2398, pp. 21–23, 1995.

A. Alphones, "Double Grating Coupler on a Grounded Dielectric Slab Waveguide," Optics Communications, vol. 92, pp. 35–39, Aug. 15, 1992.

Avrutskii, et al., An Efficient Grating Coupler, Zhurnal Tekhnicheskoi Fiziki, vol. 59, pp. 61–65, Jul. 1989.

Avrutskii, et al., "Unidirectional Coupling of Radiation out of a Composite Dielectric Waveguide," Sov. J. Quantum Electron., vol. 19, pp. 225–228, Feb. 1989.

Avrutsky, et al., "High–Efficiency Single–Order Waveguide Grating Coupler," Optics Letters, vol. 15, pp. 1446–1448, Dec. 1990.

Brazas, et al., "High–Efficiency Input Coupling into Optical Waveguides Using Gratings with Double–Surface Corrugation," Applied Optics, vol. 34, pp. 604–609, Feb. 1, 1995.

L.Li, "Analysis of Planar Waveguide Grating Couplers with Double Surface Corrugations of Identical Period," Optics Communications, vol. 114, pp. 406–412, Feb. 15, 1995.

Eriksson, et al., "Highly Efficient Grating–Coupled Surface–Emitters with Single Outcoupling Elements," IEEE Photonics Technology Letters, vol. 7, pp. 1394–1396, Dec. 12, 1995.

Eriksson, et al., "Highly Directional Grating Outcouplers with Tailorable Radiation Characteristics," IEEE Journal of Quantum Electronics, vol. 32, pp. 1038–1047, Jun. 6, 1996.

Oh, et al., "Integrated–Optic Focal–Spot Intensity Modulator using Electrooptic Polymer Waveguide," Journal of Lightwave Technology, vol. 12, pp. 1569–1576, Sep. 1994.

Roncone, et al., "Design and Fabrication of a Single Leakage Channel Grating Coupler," Applied Optics, vol. 32, pp. 4522–4528, Aug. 1993.

Roncone, et al., "Single–Leakage–Channel Grating Couplers: Comparison of Theoretical and Experimental Branching Ratios," Optics Letters, vol. 18, pp. 1919–1921, Nov. 1993.

Sychugov, et al., "Optimization and Control of Grating Coupling to or from a Silicon–Based Optical Waveguide," Opt. Engr., vol. 35, pp. 3092–3099, Nov. 1996.

Ziolkowski, et al., "Design and Characterization of a Grating–Assisted Coupler Enhanced by a Photonic–Band–Gap Structure for Effective Wavelength–Division Multiplexing," Optic Letters, vol. 22, pp. 1033–1035, Jul. 1997.

Aoyagi, et al., "High–Efficiency Blazed Grating Couplers," Applied Physics Letters, vol. 29, pp. 303–304, Sep. 1976.

Gong, et al., Efficient Grating Coupling to Poly–4BCMU Optical Waveguides, Applied Optics, vol. 29, pp.. 3887–3890, Sep. 20, 1990.

Hagberg, et al., "Demonstration of Blazing Effect in Second Order Gratings Under Resonant Condition," Electronics Letters, vol. 30, pp. 410–412, Mar. 1994.

Hagberg, et al., "High Efficiency Surface Emitting Lasers using Blazed Grating Outcouplers," Appl. Phys. Lett., vol. 67, pp. 3685–3687, Dec. 18, 1995.

Hagberg, et al., "Investigation of High–Efficiency Surface–Emitting Lasers with Blazed Grating Outcouplers," IEEE Journal of Quantum Electronics, vol. 32, pp. 1596–1605, Sep. 9, 1996.

Li, et al., "Experimental Study of Waveguide Grating Couplers with Parallelogramic Tooth Profiles," Opt. Engr., vol. 35, pp. 3101–3106, Nov. 1996.

Li, et al., "Waveguide Couplers Using Parallelogramic–Shaped Blazed Gratings," Optics Communications, vol. 109, pp. 239–245, Jul. 1994.

Li, et al., "Unidirectional Surface–Normal Waveguide Grating Couplers for Wafer–Scale MCM Interconnect," in Proc. SPIE, vol. 3005, pp. 136–142, 1997.

Liao, et al., "High–Efficiency Focusing Waveguide Grating Coupler with Parallelogramic Groove Profiles," Journal of Lightwave Technology, vol. 15, pp. 1142–1148, Jul. 1997.

M. Matsumoto, "Analysis of the Blazing Effect in Second–Order Gratings," IEEE Journal of Quantum Electronics, vol. 28, pp. 2016–2023, Oct. 1992.

Waldhausl, et al., "Efficient Coupling into Polymer Waveguides by Gratings," Applied Optics, vol. 36, pp. 9383–9390, Dec. 1997.

Waldhausl, et al., "Efficient Focusing Polymer Waveguide Grating Couplers," Electronics Letters, vol. 33, pp. 623–624, Mar. 1997.

Bates, et al., "Gaussian Beams from Variable Groove Depth Grating Couplers in Planar Waveguides," Applied Optics, vol. 32, pp. 2112–2116, Apr. 1993.

Strasser, et al., "Grating Coupler Acceptance Design Utilizing a Tapered Waveguide Structure," Applied Optics, vol. 32, pp. 6006–6017, Oct. 1993.

Touam, et al., "Symmetric Profile Beams from Waveguides with Asymmetric Grating Couplers," Applied Optics, vol. 36, pp. 2554–2558, Apr. 1997.

A. Dorsel, "Design of a Double Grating Coupler with Gaussian Output Wave," Optics Communications, vol. 97, pp. 1–5, Mar. 1, 1993.

Liao, et al., "Integrated Waveguide Diffractive Doublet for Guided–Wave Manipulation," Applied Optics, vol. 36, pp. 5476–5481, Aug. 1997.

Liao, et al., "Integrated–Optic Array Illuminator: A New Design for Guided–Wave Optical Interconnections," Applied Optics, vol. 37, pp. 2729–2734, May 1998.

Sheard, et al., "Focusing Waveguide Grating Coupler using a Diffractive Doublet," Applied Optics, vol. 36, pp. 4349–4353, Jul. 1997.

Amitai, et al., "Recursive Design of a Holographic Focusing Grating Coupler," Applied Optics, vol. 30, pp. 3886–3890, Sep. 20, 1991.

Braat, et al., "Geometrical Optics Design and Aberration Analysis of a Focusing Grating Coupler," OPt. Engr., vol. 33, pp. 1037–1042, Apr. 1994.

Dorsel, et al., "Estimation of Production Tolerances for a Focusing Grating Coupler," Applied Optics, vol. 31, pp. 5158–5166, Sep. 1, 1992.

Heitmann, et al., "Two–Dimensional Focusing Holographic Grating Coupler," Appl. Phys. Lett., vol. 27, pp. 585–587, Oct. 1990.

Heitmann, et al., "Calculation and Experimental Verification of Two–Dimensional Focusing Grating Couplers," Applied Optics, vol. 17, pp. 1257–1263, Jul. 1981.

Kawakubo, et al., "Integrated Optical–Disk Pickup that uses a Focusing Grating Coupler with a High Numerical Aperture," Applied Optics, vol. 33, pp. 6855–6859, Oct. 10, 1994.

Nishiwaki, et al., "Optical Head Employing a Concentric–Circular Focusing Grating Coupler," Applied Optics, vol. 33, pp. 1819–1827, Apr. 1, 1994.

Nishiwaki, et al., "Fabrication of a Concentric–Circular Focusing Grating Coupler by a Conic–Wave–Front Interface Method and Light–Convergence Experiments . . . ," Appl. Opt., vol. 34, pp. 7372–7382, Nov. 1, 1995.

S. Nishiwaki, "Aberrations and Convergence Characteristics of a Concentric–Circular Focusing Grating Coupler: Analysis," Applied Optics, vol. 34, pp. 7361–7371, Nov. 1, 1995.

Sogawa, et al., Fabrication of Aberration–Free Focusing Grating Couplers, Applied Optics, vol. 29, pp. 5103–5105, Dec. 1990.

Song, et al., Focusing–Grating–Coupler Arrays for Uniform and Efficient Signal Distribution in a Backboard Optical Interconnect, Applied Optics, vol. 34, pp. 5913–5919, Sep. 1995.

Suhara, et al., "Focusing Grating Coupler in AIGaAs Optical Waveguide," IEEE Photonics Technology Letters, vol. 4, pp. 903–905, Aug. 1992.

Suhara, et al., "Monolithic Integrated–Optic Position/Displacement Sensor using Waveguide Gratings and QW–DFB Laser," IEEE Photonics Technology Letters, vol. 7, pp. 1195–1197, Oct. 1995.

Ura, et al., "Focusing Grating Couplers for Polarization Detection," Journal of Lightwave Technology, vol. 6, pp. 1028–1033, Jun. 1988.

Ura, et al., "Linearly Focusing Grating Coupler for Integrated–Optic Parallel Pickup," J. Opt. Soc. Amer. A, vol. 7, pp. 1759–1763, Sep. 1990.

Ura, et al., Integrated–Optic Grating–Scale–Displacement Sensor using Linearly Focusing Grating Couplers, IEEE Photonics Technology Letters, vol. 6, pp. 239–241, Feb. 1994.

Ura, et al., "Integrated Optic Head for Sensing a Two–Dimensional Displacement of a Grating Scale," Applied Optics, vol. 35, pp. 62661–6266, Nov. 1996.

Waldhausl, et al., "Grating Couplers in Planar Polymer Waveguides with Beam Shaping Properties," in Proc. SPIE, vol. 2213, pp. 122–132.

* cited by examiner

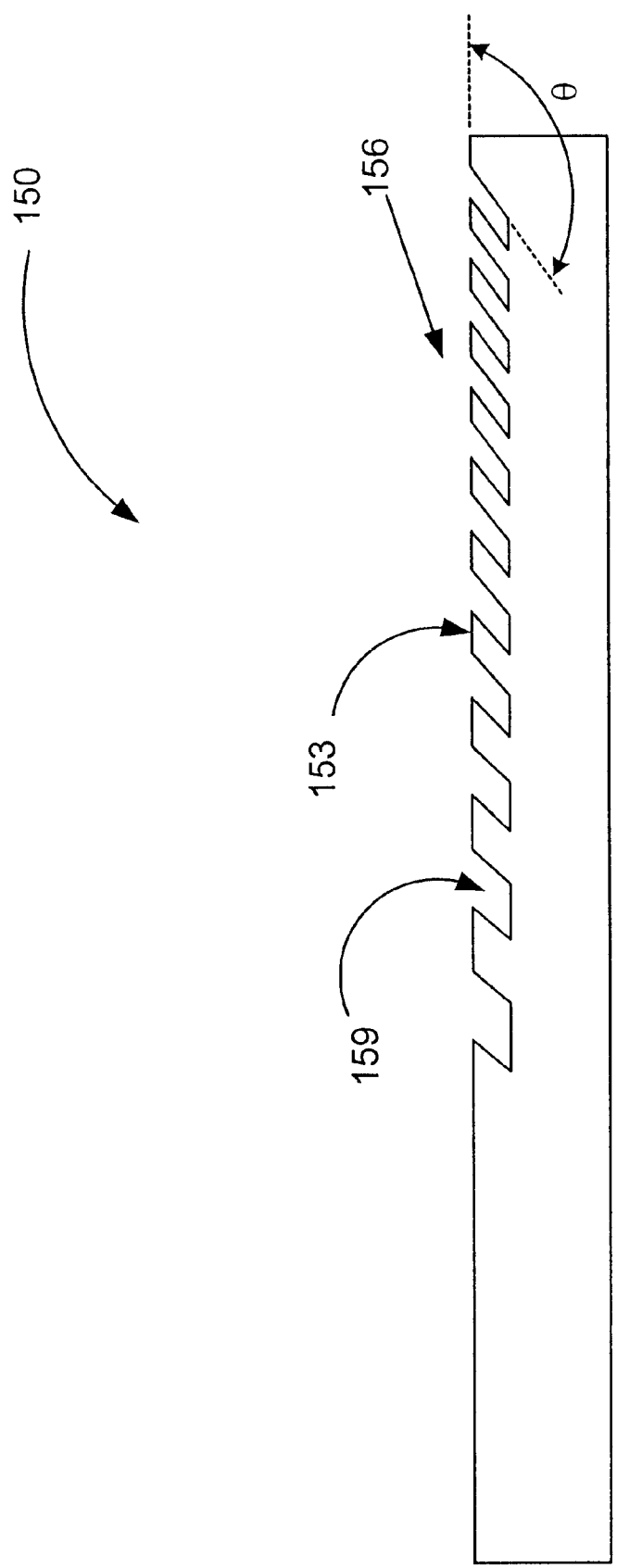

DIFFRACTIVE GRATING COUPLER AND METHOD

CROSS REFERENCE TO RELATED APPLICATIONS

This application claims the benefit of co-pending United States Provisional patent application entitled "Focusing or Collimating Diffractive Grating Coupler and Method for Designing Coupler and Method for Fabricating Coupler" filed on Oct. 3, 1997 and assigned Ser. No. 60/060,774, which is incorporated herein by reference in its entirety.

STATEMENT REGARDING FEDERALLY SPONSORED RESEARCH OR DEVELOPMENT

Not Applicable.

TECHNICAL FIELD

This application relates to the field of optical coupling, and more particularly, to the field of diffractive grating in-coupling and out-coupling of guided optical waves.

BACKGROUND INFORMATION

Current communications systems are being stressed due to the ever increasing demand for greater bandwidth to handle evolving communications needs. More and more, telecommunications systems are evolving to meet these needs by employing optical signaling systems, which employ optical fiber and specialized optical circuits and components.

The creation of such optical components has become a time consuming and expensive proposition. The optical fibers and optical circuits manufactured today are microscopic in size, where typical optical waveguides feature a cross-section of but a few microns in diameter.

Due to the size of optical waveguides and optical circuitry and other factors, current processes employed in their manufacture can be very costly and labor intensive. With regard to particular components employed to couple a guided wave from one optical waveguide to a detector or another waveguide, or to couple a light source to a waveguide, this is especially the case. In these couplers, oftentimes a lens is employed to focus the exiting light so as to allow the light to enter a second waveguide without obstruction or loss. Positioning of such a lens is quite labor intensive, as are the subsequent steps of packaging the overall device, translating into a very high cost. This high cost impedes the overall creation of optical communications systems. Consequently, there is a need for a diffractive coupler that can be manufactured simply, thereby allowing such components to be manufactured at significantly reduced cost with low labor requirements.

BRIEF SUMMARY OF THE INVENTION

The present invention entails a volume grating for use in an optical coupler which comprises a grating-cover interface plane having a predetermined surface grating pattern with a decreasing surface grating period along a waveguide light propagation direction in the volume grating, with a plurality of slanted grating fringes having a variable slant angle along the waveguide light propagation direction to focus coupled light in a first dimension with a predetermined light intensity profile along the grating-cover interface plane of the volume grating. In addition, the predetermined surface grating pattern further includes an increasing radius of curvature along the waveguide light propagation direction to focus the light in a second dimension.

The present invention may also be viewed as a method for coupling light from a waveguide to a focused line or spot. This method comprises the steps of directing a laser light beam into a waveguide having a volume grating, coupling the laser light with a plurality of slanted grating fringes having a variable slant angle along the waveguide light propagation direction, and focusing the laser light with a predetermined surface grating pattern having a decreasing surface grating period along a waveguide light propagation direction in the volume grating. The method further comprises the step of focusing the laser light with fringes having an increasing radius of curvature along the waveguide light propagation direction in the volume grating.

Another embodiment of the present invention entails a system for creating a volume grating for use in an optical coupler, the system comprising a pair of mutually coherent laser beams which are conditioned to create an interference pattern in a recording material. This interference is characterized by a cross section having a surface pattern with a decreasing surface period along the waveguide light propagation direction in the recording material, and slanted fringes having a variable slant angle along the waveguide light propagation direction. The cross-section surface pattern may be further characterized by an increasing radius of curvature along the waveguide light propagation direction.

The present invention may further be viewed as a method for creating a volume grating for use in an optical coupler which is comprised of the steps of generating a laser beam and splitting the laser beam into a pair of mutually coherent laser beams. Next, the pair of mutually coherent laser beams are directed into an optical coupling component which is configured to optically couple the pair of laser beams to a recording material. Finally, the pair of mutually coherent laser beams are focused to create an interference pattern in the recording material with a cross-section having a surface pattern with a decreasing surface period along a waveguide light propagation direction in the volume grating, and a plurality of slanted fringes having a variable slant angle along the waveguide light propagation direction. The method may further comprise the step of conditioning the pair of mutually coherent laser beams creating the interference pattern such that the surface pattern is further characterized by an increasing radius of curvature along the waveguide light propagation direction.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 6 is a sectional view of a surface-relief grating according to another embodiment of the present invention;

DETAILED DESCRIPTION OF THE INVENTION

Figure 1A:
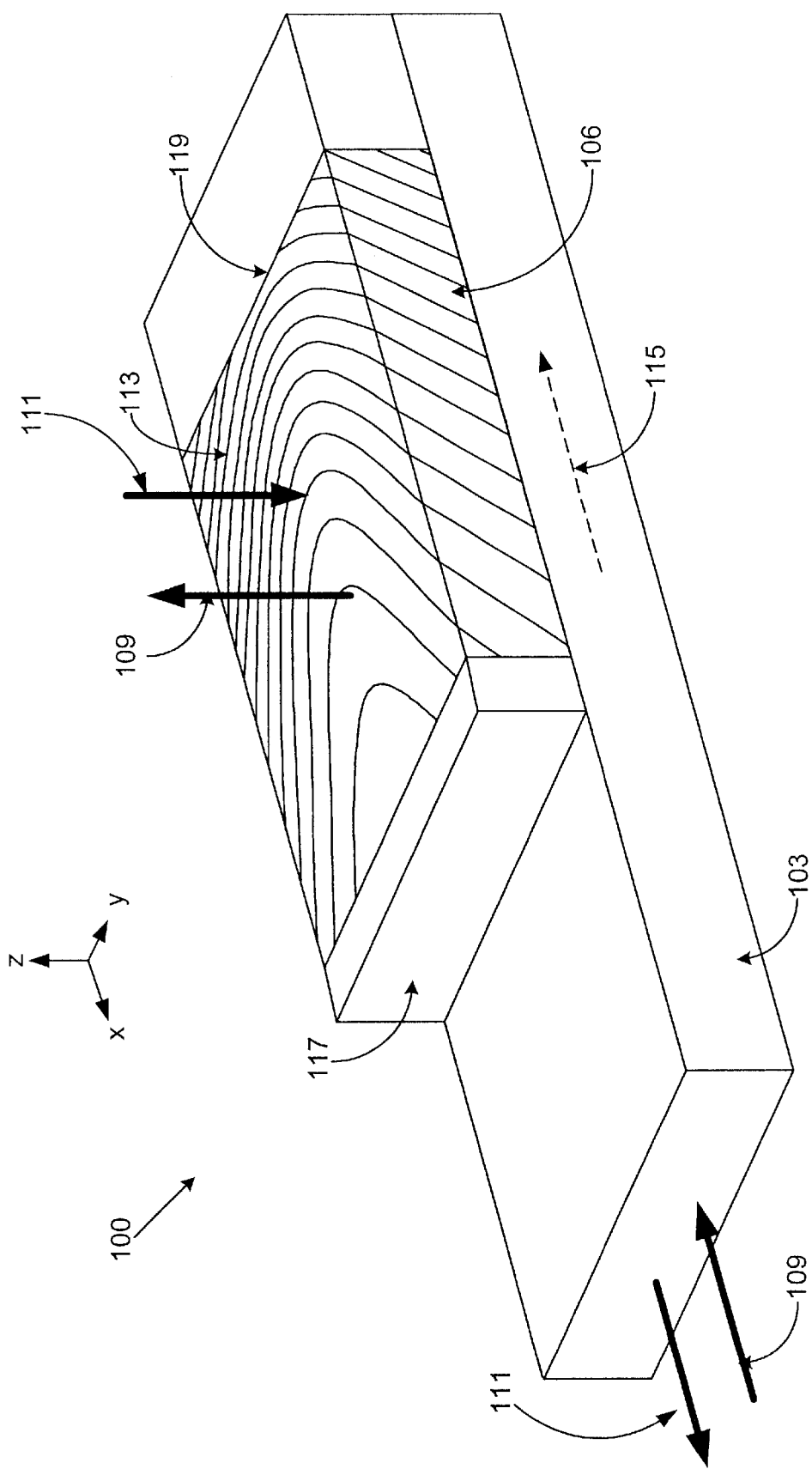
FIG. 1A is a drawing showing an optical coupler according to an embodiment of the present invention.

Referring to FIG. 1A, shown is an optical coupler 100 according to an embodiment of the present invention. In general the optical coupler 100 comprises an optical waveguide 103 with a volume grating 106 disposed on top. Generally laser light 109 transmitted through the optical waveguide 103 is redirected by the volume grating 106 and exits from a grating-cover interface plane 113 of the volume grating 106, where the cover is air, for example, but may be other materials, etc. A coupler that passes laser light 109 in such a manner is termed an output coupler.

However, a second laser light 111 may enter the volume grating through the grating-cover interface plane 113, and exit out of the waveguide as shown. An optical coupler used in this manner is termed an input coupler. Generally, an optical coupler is used either as and input coupler or as an output coupler.

The volume grating 106 is designed with a specific waveguide light propagation direction 115 in the waveguide 103, which, is defined herein as being the direction starting at the leading edge 117 and ending to the trailing edge 119. Although the laser light 111 may travel in a direction that is in the opposite direction of the waveguide light propagation direction 115, the waveguide light propagation direction 115 is defined as the direction of light in the waveguide 103 seen in an output coupler in which laser light 109 exits through the grating-cover interface plane 113. The volume grating 106 features a predetermined index of refraction pattern with a specific surface grating pattern across the grating-cover interface plane 113 as will be discussed.

Figure 1B:
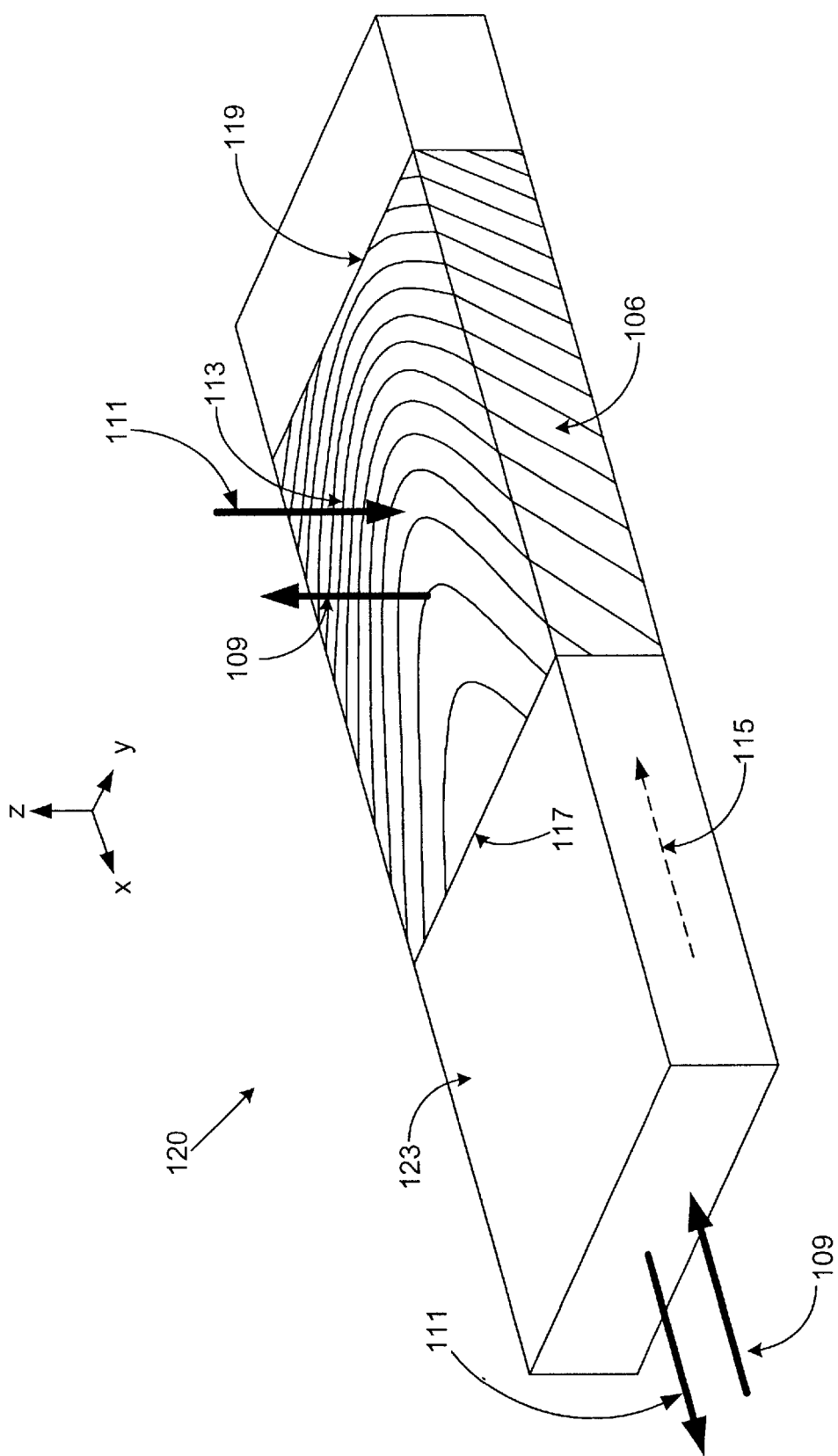
FIG. 1B is a drawing showing a second optical coupler according to another embodiment of the present invention.

Turning to FIG. 1B, shown is an optical coupler 120 according to a second embodiment of the present invention. The optical coupler 120 comprises an optical waveguide 123 which transitions into the volume grating 106. Similar to the optical coupler 100, laser light 109 transmitted through the optical waveguide 123 is redirected by the volume grating 106 and exits from a grating-cover interface plane 113 of the volume grating 106. Once again, the volume grating 106 is designed with a specific waveguide light propagation direction 115, which, is from the leading edge 117 to the trailing edge 119 as previously stated.

Figure 2:
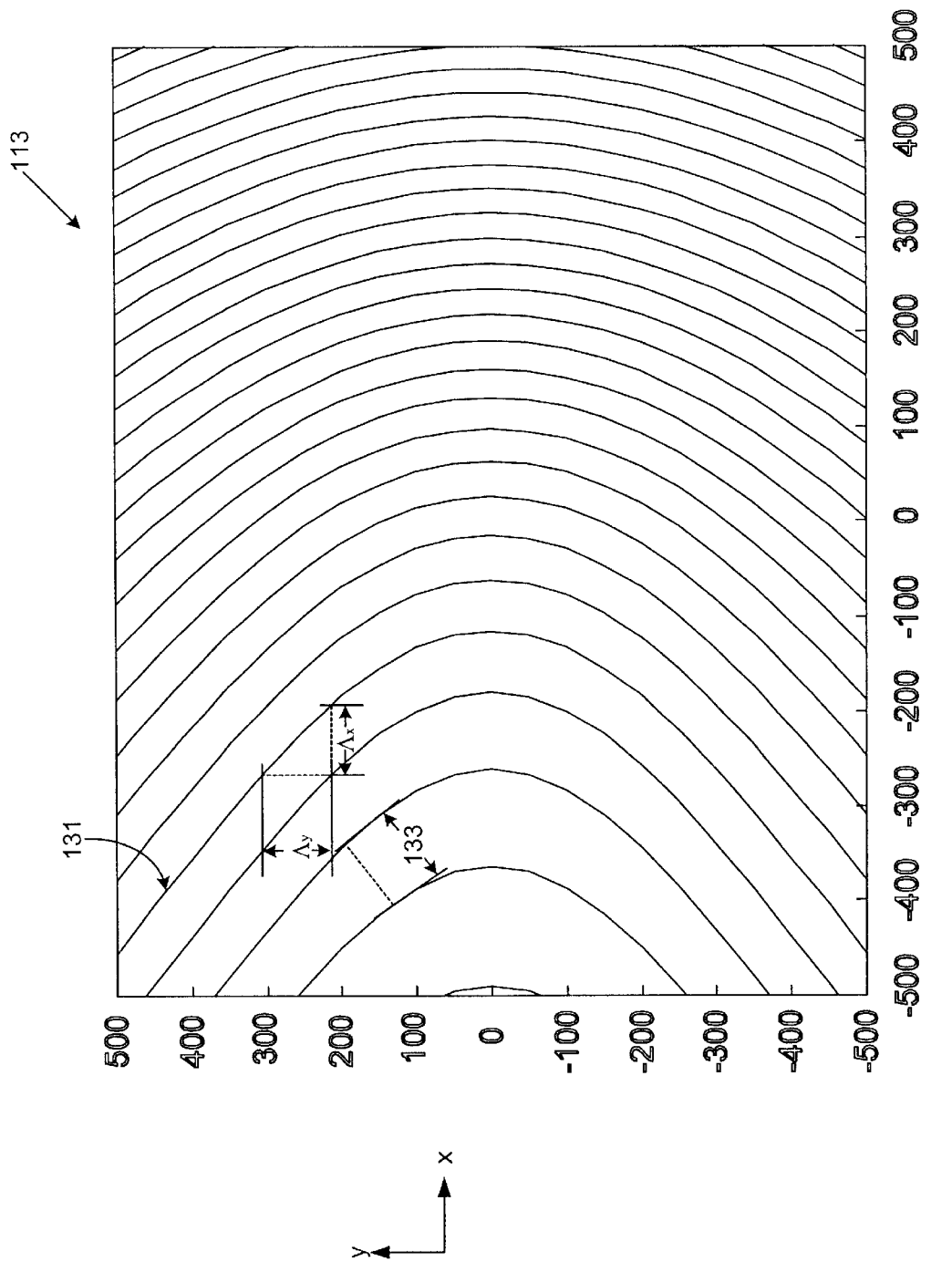
FIG. 2 is a drawing illustrating the surface grating pattern of a volume grating used in the optical couplers of FIGS. 1A and 1B.

Referring next to FIG. 2, shown is the grating-cover interface plane 113 which illustrates the tops of several fringes 131 or the surface grating pattern of the volume grating 106 (FIGS. 1A and 1B). The fringes 131 indicate where the index of refraction along the grating-cover interface plane 113 is at a maximum. The distance between any two fringes 131 along an axis which travels along the waveguide light propagation direction 115 is the surface grating period 133. Note in FIG. 2 the grating-cover interface plane 113 is shown as an x-y plane. The x direction indicates the length of the grating-cover interface plane 113 in the propagation direction in micrometers, and the y direction indicates the width of the grating-cover interface plane 113 in micrometers, where only every one hundredth fringe is shown.

The nature of the pattern formed by the fringes 131 on the grating-cover interface plane 113 determines the direction in which the laser light 109 (FIGS. 1A and 1B) will exit the grating-cover interface plane 113. In particular, the laser light 109 is focused a first dimension (along a line perpendicular to the waveguide light propagation direction 115) by decreasing the surface grating period 133 along the waveguide light propagation direction 115 of the grating-cover interface plane 113 as shown in FIG. 2. The laser light 109 can be focused in a second dimension (along a line parallel to the waveguide light propagation direction 115) by increasing a radius of curvature of the surface grating pattern along the waveguide light propagation direction 115. Note then, that it is possible to focus the laser light 109 exiting the grating-cover interface plane 113 along a single line in the first dimension if the surface grating pattern featured no curvature, but only the decreasing surface grating period 133 along the waveguide light propagation direction 115 of the grating-cover interface plane 113. The same could be accomplished by a surface grating pattern which featured the curvature without a decreasing surface grating period 133.

In addition, the volume grating 106 may be advantageously designed for a collimating coupler such that the laser light 109 exits the grating-cover interface plane 113 with a near infinite focus in the first and second dimensions. This is accomplished by constructing an even surface grating pattern with no decreasing surface grating period and no curvature in the grating fringes. Such a collimating coupler would be relatively insensitive to positioning as the laser light 109 that exits the grating-cover interface plane 113 generally does not expand to a large extent, making for a robust optical coupler.

Figure 3:
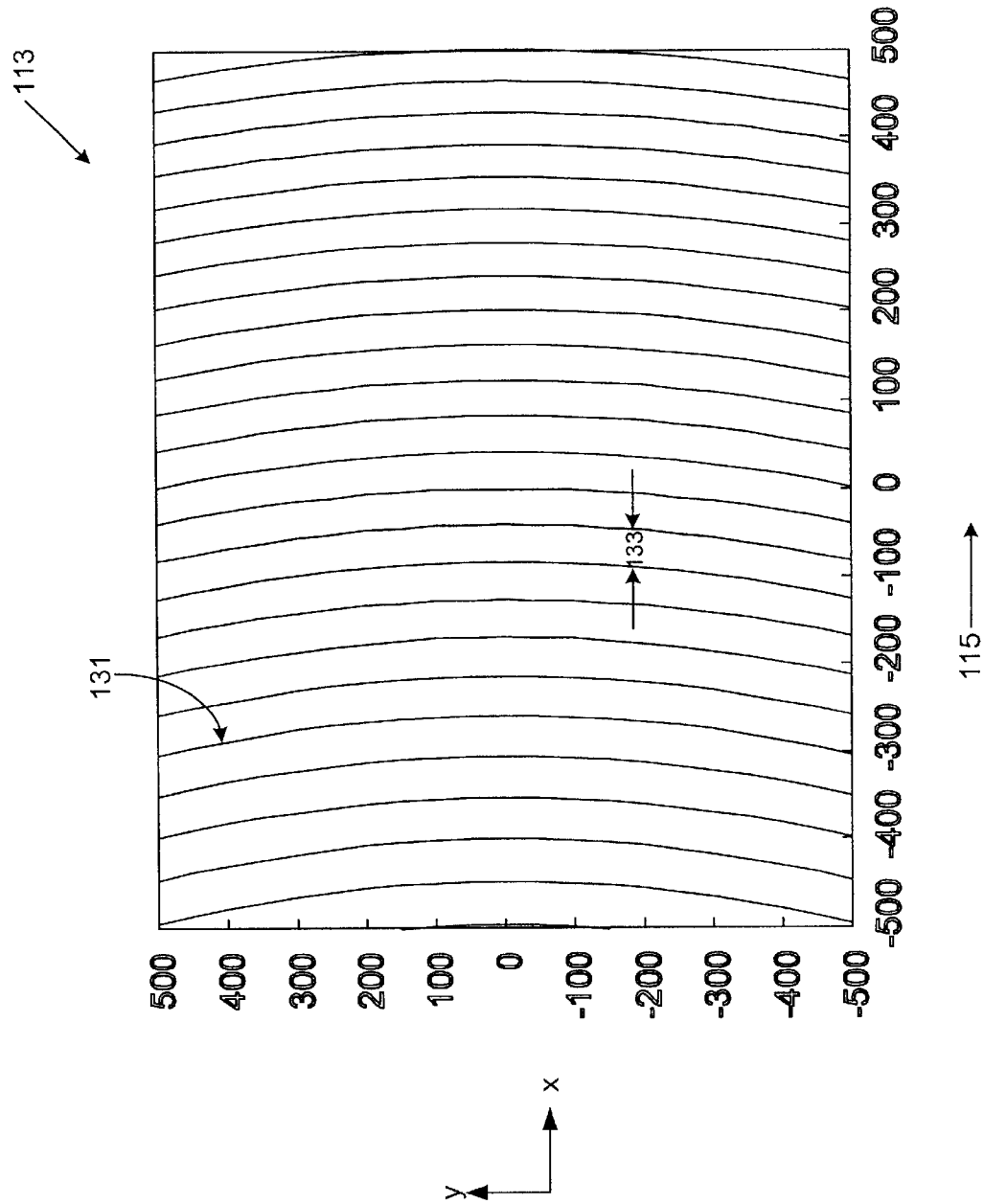
FIG. 3 is a drawing illustrating a second surface grating pattern of a volume grating used in the optical couplers of FIGS. 1A and 1B.

Turning to FIG. 3, shown is another view of a grating-cover interface plane 113 which illustrates the surface grating pattern of the volume grating 106 (FIGS. 1A and 1B) with a different decreasing surface grating period 133. In FIG. 3, the change in both the surface grating period 133 (decreasing) and the radius of curvature (increasing) along the waveguide light propagation direction 115 are very small and difficult to see. The decreasing surface grating period 133 and increasing radius of curvature of surface grating pattern of the grating-cover interface plane 113 results in a f-number of 4, which contrasts with a f-number of 0.5 for the grating-cover interface plane 113 of FIG. 2. Thus, FIG. 3 shows a grating-cover interface plane 113 which is more likely to be employed for various applications.

Referring back to FIG. 2, the actual surface grating pattern, i.e. the surface grating period 133 and the curvature of the surface grating pattern, is determined by calculating the x-component and the y-component of the surface grating vector component K across the grating-cover interface plane 113. The x and y components are denoted $K_X$ and $K_Y$, respectively, where $$K_x = \frac{2\pi}{\Lambda_x},$$

and $$K_y = \frac{2\pi}{\Lambda_y}.$$

The equations include:

$$K_x = N_{eff}k_o + \frac{(x-L/2)k_o}{\sqrt{(x-L/2)^2 + y^2 + f^2}}$$

and $$K_y = \frac{yk_o}{\sqrt{(x-L/2)^2 + y^2 + f^2}}$$

where x is the waveguide light propagation direction 115, y is the direction perpendicular to the waveguide light propagation direction 115, $k_0=2\pi/\lambda$, which is the wave vector of free space, $\lambda$ is the wavelength of the laser light 109 (FIGS. 1A and 1B), $N_{eff}$ is the effective index of the guided mode, f is the focal length of the outcoupled light, and L is the length of the volume grating 106 (FIGS. 1A and 1B). These equations assume that x=0 at the beginning of the volume grating 106 (i.e. 0<x<L, -L/2<y<L/2).

Figure 4:
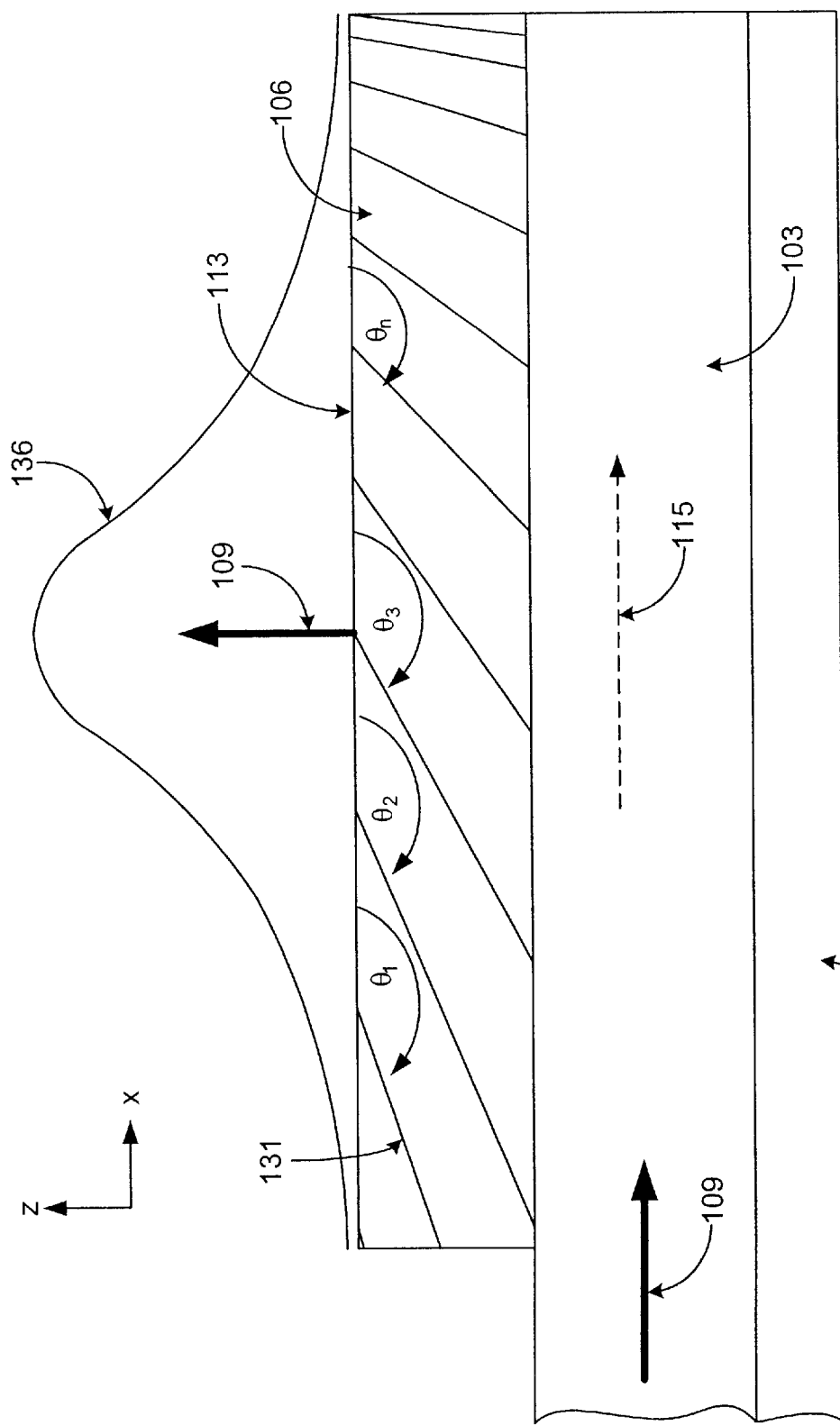
FIG. 4 is a drawing showing a cross-sectional view of the optical coupler of FIG. 1A.

Referring to FIG. 4, shown is a cross-sectional view of the optical coupler 100 in which the fringes 131 of the volume grating 106 are illustrated. Note that the fringes 131 are slanted by a slant angle θ with respect to the grating-cover interface plane 113. The slanting of the fringes 131 in this manner ensures that laser light 109 that is guided through the waveguide 103 is diffracted into a beam whose axis is at a predetermined angle with respect to the waveguide light propagation direction 115, i.e., the laser light 109 is diffracted into a single diffracted order. This selective coupling into a single diffracted order is called "preferential-order coupling." Thus, the volume grating 106 is described as having a "preferential-order" in that the laser light 109 exits out of the waveguide 103 in a single direction. In FIG. 4, the direction in which the laser light 109 exits the waveguide is shown through the grating-cover interface 113. This direction is perpendicular to the waveguide light propagation direction 115 as shown, however, it is understood that the exit direction may be at a predetermined angle other than 90° with respect to the waveguide light propagation direction 115. In addition, the laser light may also exit in the opposite direction into the substrate 121 at any predetermined angle if the to fringes 131 are oriented accordingly.

In addition, the volume grating 106 features fringes 131 with a variable slant angle θ across the volume grating 106. According to the present invention, the slant angle θ is varied to achieve a desired light intensity profile along the grating-cover interface plane 113. To explain further, as the laser light 109 enters the region of the waveguide 103 under the volume grating 106, it is diverted in the perpendicular direction by the volume grating 106. The coupling rate by which the laser light 109 is diverted varies with the slant angle θ. This coupling rate is referred to herein as the coupling coefficient α. As the laser light 109 passes through the waveguide 103 in the waveguide light propagation direction 115, the power of the laser light 109 is depleted as more and more is coupled out of the waveguide 103. Consequently, the actual intensity of the light diverted at a given point on the volume grating 106 along the waveguide light propagation direction 115 is a function of both the power of the laser light 109, and, the slant angle θ at that point.

Note, if the slant angle θ were constant throughout the volume grating 106, then the light intensity profile at the grating-cover interface plane 113 along the waveguide light propagation direction 115 would be proportional to the power of the laser light 109 along the waveguide light propagation direction 115. Such a light intensity profile is difficult to focus due to its lopsided nature.

The present invention provides a distinct advantage in that a variable slant angle θ is employed to achieve a predetermined light intensity profile at the grating-cover interface plane 113 along the waveguide light propagation direction 115. For example, a Gaussian light intensity profile 136 may be achieved as will be discussed. However, it should be understood that the slant angle θ may be varied in an infinite number of ways to achieve any desired light intensity distribution at the grating-cover interface plane 113 limited only by the availability of a fabrication process by which the appropriate slant angles θ can be created in a particular volume grating 106. For example, a uniform light intensity profile may be desirable.

Thus, the present invention provides a distinct advantage in that the laser light 109 may be focused to a more precise spot as the light intensity profile can be made symmetrical with respect to focal point, or with respect to a line if focused in a single dimension. Also, the light intensity profile can be varied according to any predefined criteria. Note that the slant angle may be any angle from 0° to 180°, understanding that any angle over 180° is actually the counterpart angle between 0° to 180° offset by 180°.

Figure 5A:
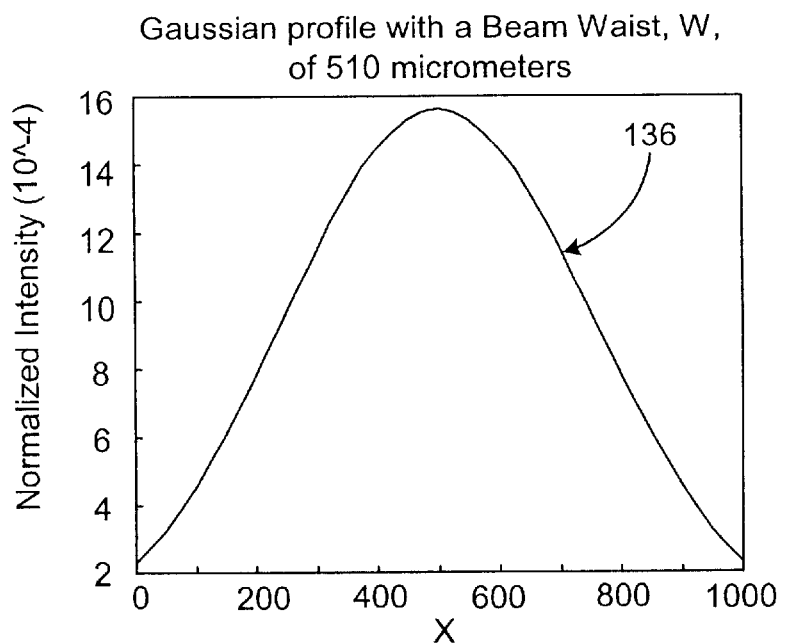
FIG. 5A is a graph showing a Gaussian light intensity profile of a volume grating used in the optical couplers FIGS. 1A and 1B.

Referring next to FIG. 5A shown is a graph of a Gaussian light intensity profile 136. The Gaussian light intensity profile 136 may be calculated using the formula $$I(x, y) = \left\{ \frac{1}{\pi W^2} \exp\left(-2\frac{(x-L/2)^2 + y^2}{W^2}\right) \right\}$$

where W is defined as the specified Gaussian beam waist, and the position x is defined as varying from 0 to length L (truncating the Gaussian profile), where L is the length of the volume grating in question.

Figure 5B:
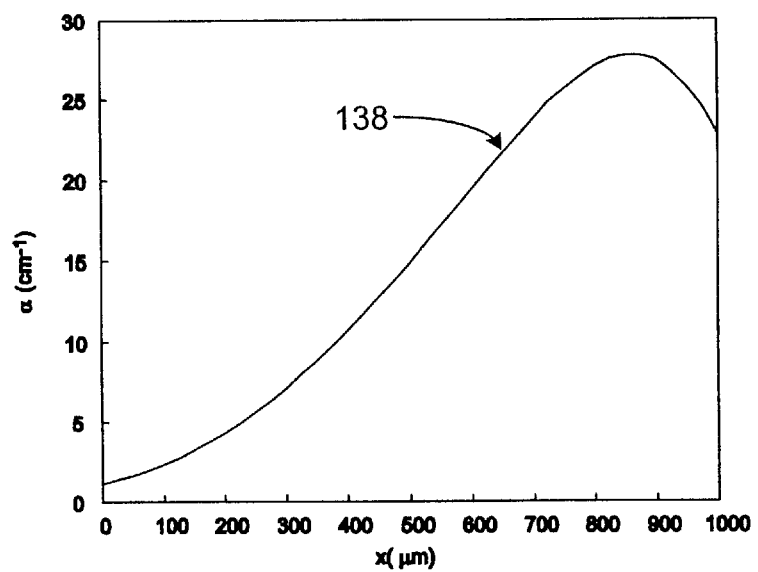
FIG. 5B is a graph showing a coupling coefficient curve of a volume grating used in the optical couplers FIGS. 1A and 1B.

Turning to FIG. 5B, shown is a graph of the coupling coefficient α in terms of the position x along the waveguide light propagation direction 115 (FIG. 4) of the volume grating (FIG. 4). The coupling coefficient curve 138 is that which achieves the Gaussian light intensity profile 136 (FIG. 5A) and is calculated by solving for α using the following equation $$2\alpha \exp\left(-2\int_0^x \alpha dx\right) = \frac{1}{\sqrt{2\pi}\,W} \exp\left(-\frac{(x-L/2)^2}{2W^2}\right).$$

Note that if a different light intensity profile is desired, the Gaussian equation on the right side of the equation above is replaced with the appropriate function which represents the desired intensity profile. Also note that there is no "y" term in the above equation as the y dependence of the desired intensity profile is contained in an incident guided wave (i.e. the laser light 109 (FIGS. 1A and 1B) in the waveguide 103 (FIG. 1A)).

In addition, the slant angle θ is related to the z component of the grating vector K, denoted $K_Z$, by the equation $$\theta = \tan^{-1}\left(\frac{K_X}{K_Z}\right).$$

In order to obtain the Gaussian light intensity profile 136 or other profile, the coupling coefficient α is defined in terms of the grating vector $K_Z$ for a specific volume grating 106 (FIG. 4) as will be discussed. Once this relationship is known, then the grating vector $K_Z$ is determined across the volume grating 106 based on the coupling coefficient curve 138 (for a Gaussian profile). The slant angle θ is calculated using the inverse tangent equation above.

Turning to FIG. 6, shown is a surface-relief grating 150 according to yet another embodiment of the present invention. The surface-relief grating includes separated ridges 153 which form a grating-cover interface plane 156 comprising the same surface grating pattern with the decreasing surface grating period and increasing radius of curvature, the separated ridges 153 having a variable slant angle similar to the grating pattern of the volume grating 106 as discussed above. The separated ridges 153 are separated by grooves 159. Such a variable slanted surface relief grating profile could be fabricated with an interferometric exposure using a predefined photopolymer, or a directional etching process.

In yet another embodiment of the present invention, the volume grating 106 (FIG. 4) may be replaced by a combination volume and surface relief grating in which grooves 159 formed on the grating-cover interface plane 113 are partially filled with a material having a low index of refraction to enhance the coupling of the laser light 109/119 (FIG. 4).

Figure 7:
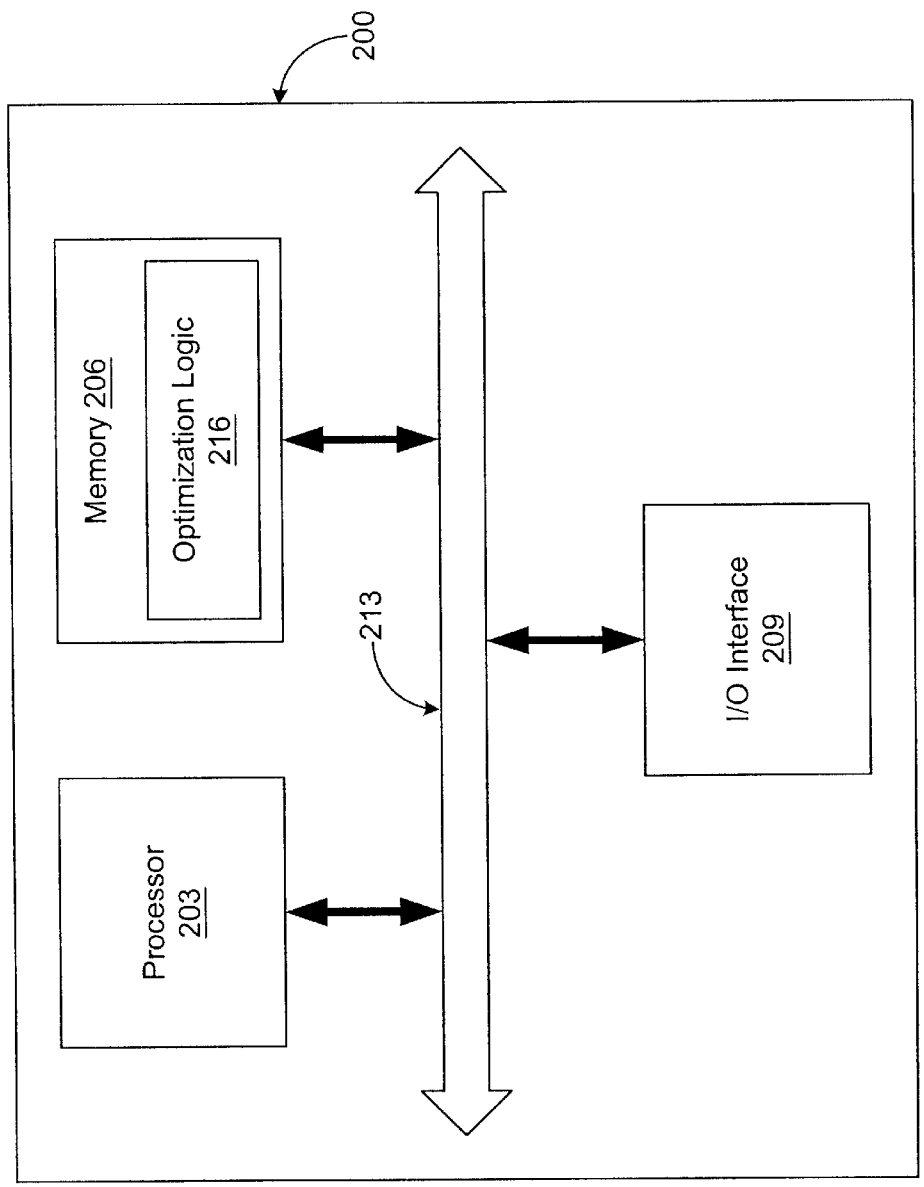
FIG. 7 is a block diagram showing a system for designing the volume grating used in the optical couplers FIGS. 1A and 1B.

Turning to FIG. 7 shown is an optimization system 200 which determines the relationship between the grating vector $K_Z$ and the coupling coefficient α according to an embodiment of the present invention. The optimization system 200 is comprised of a standard computer which includes a processor 203, memory 206, and an input/output (I/O) interface 209. The processor 203, memory 206, and an input/output interface 209 are all coupled to a common data bus 213. The I/O interface 209 may be electrically coupled to any one of a number of peripheral equipment (not shown) such as a keyboard, display, printer, or other device. Multiple I/O interfaces 209 may be employed to couple multiple peripheral devices. Stored on the memory 206 is optimization logic 216 for determining the relationship between the grating vector $K_Z$ and the coupling coefficient α.

Figure 8:
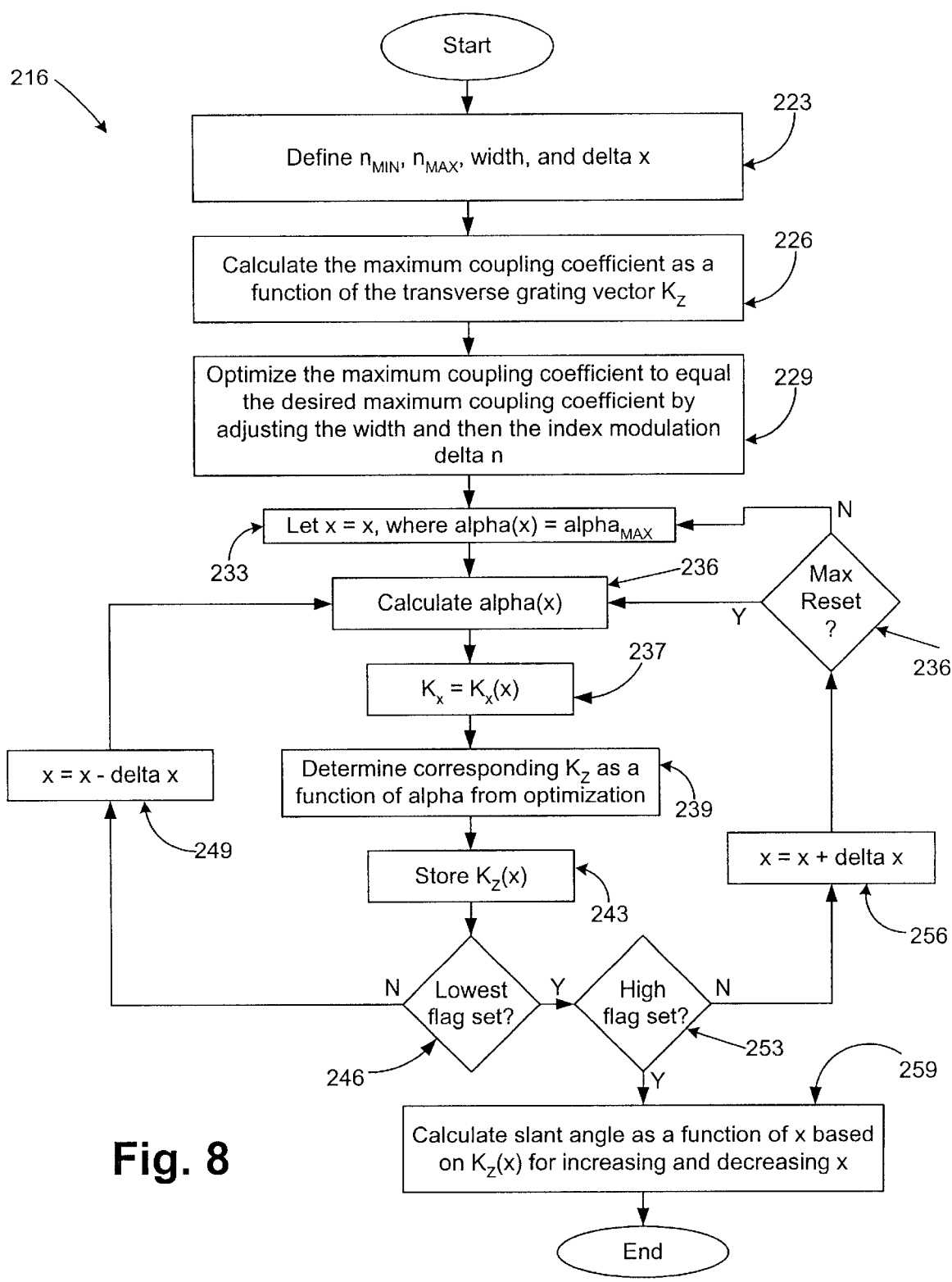
FIG. 8 is a flow chart showing the optimization logic employed by the system of FIG. 7.

Referring next to FIG. 8, shown is the optimization logic 216. In block 223, input variables are defined including the minimum index of refraction $n_{MIN}$, the maximum index of refraction $n_{MAX}$, width of the volume grating, and Δx to be used in later calculation. Other variables defined include basic coupler parameters such as λ which is the wavelength of the laser light, $n_S$ which is the index of refraction of the substrate, $n_C$ which is the index of refraction of the cover above the grating (i.e., air), $n_W$ which is the index of refraction of the waveguide 103 (FIG. 4), $n_G$ which is the average index of refraction of the volume grating 106 (FIG. 4), $K_X$ which is the x-component of the grating vector K (FIG. 2) and the thickness of the waveguide 103 and/or the volume grating 106. Next, in block 226 the transverse grating vector component $K_Z$ is calculated for a maximum coupling coefficient α based on predetermined parameters. The calculation of the transverse grating vector component $K_Z$ may be determined with reference to the following articles: T. K. Gaylord and M. G. Moharam, "Analysis of Optical Diffraction by Gratings", Proc. IEEE, 73, 891–938 (1985); N. Neviere, "The Homogeneous Problem", Electromatic Theory of Grating, R. Petit ed. (Springer-Verlag, Berlin, 1980), ch. 5, 123–157; and S. Peng, T. Tamir, and H. Bertoni, "Theory of Periodic Dielectric Waveguides", Trans. on Microwave Theory and Techniques, 23, 123–133 (1975); the entire text of these three articles being incorporated herein by reference.

In block 229, the peak value of coupling coefficient α as a function of the transverse grating vector $K_Z$ is optimized so that it is approximately equal to the desired maximum coupling coefficient determined previously for a specific light intensity profile (such as the coupling coefficient as a function of position x in FIG. 5B.) The optimization of the peak value can be performed with reference to the above mentioned articles.

It has been discovered that this optimization is best achieved by adjusting the width of the volume grating first, which varies the height and the width of the coupling coefficient peak. Secondly, the magnitude of Δn is calculated, Δn being the difference between minimum index of refraction $n_{MIN}$, and the maximum index of refraction $n_{MAX}$. Generally varying Δn causes the height of the coupling coefficient peak to shift higher or lower, with the width remaining approximately the same. It is desirable to establish a narrower peak before adjusting Δn as this will result in a smaller change in the grating period. Next, in block 233, the position variable x is set equal to the corresponding x position on the coupling coefficient graph (see FIG. 5A) at which the coupling coefficient α is a maximum. Thereafter, in block 236, the coupling coefficient α(x) is calculated. In block 237, $K_x$ is set equal to $K_x(x)$, where $$K_x = N_{eff}k_o + \frac{(x-L/2)k_o}{\sqrt{(x-L/2)^2 + y^2 + f^2}}.$$

Then, in block 239, the transverse grating vector $K_Z$ is determined by matching the coupling coefficient determined as a function of the transverse grating vector $K_Z$ (in the optimization of step 229) with α(x), and determining the corresponding value for $K_Z$. Note that there are two values of the $K_z(x)$ that match this value for the coupling coefficient. A value for $K_z(x)$ is chosen such that $K_z(x)$ is increasing or decreasing monotonically. Whether one chooses $K_z(x)$ to be increasing or decreasing preferably depends on which resulting lens configuration is easier to implement as will be discussed. In block 243, the value determined for the transverse grating vector $K_Z$ is stored as $K_Z(x)$.

Next, in block 246, it is determined whether the low boundary flag is set which indicates that the position variable x has been equal to its lowest value $X_{MIN}$, which is preferably zero. If not, the optimization logic 216 proceeds to block 249 where the position variable x is reduced by Δx. If the position variable x is now equal to its lowest value $X_{MIN}$, then the low boundary flag is set. Thereafter, the logic reverts back to block 236. If the low boundary flag has been set, the optimization logic 216 proceeds to block 253 in which it is determined whether the high boundary flag is set, which indicates that the position variable x is equal to its highest value $X_{MAX}$, which is preferably the position value corresponding to the length of the volume grating. If not, then the optimization logic 216 progresses to block 256. If, in block 253, the high boundary flag has already been set, then the logic proceeds to block 259.

In block 256, the position variable x is increased by Δx. If the position variable x is now equal to its highest value $X_{MAX}$, then the high boundary flag is set. Thereafter, the logic progresses to block 263 in which it is determined whether a maximum reset flag has been set which indicates that the position variable x has been reset to corresponding x position on the coupling coefficient graph (see FIG. 5A) at which the coupling coefficient α is a maximum after the low boundary flag has been set. If the maximum reset flag has not been set, the then logic reverts to block 233 and the maximum reset flag is set. If the maximum reset flag has been set, then the logic reverts to block 236. In block 259, the slant angle θ(x) is determined from the values of $K_Z(x)$ stored in memory by calculating the inverse tangent of $K_X/K_Z$. Thereafter, the optimization logic 216 is at an end.

Figure 9:
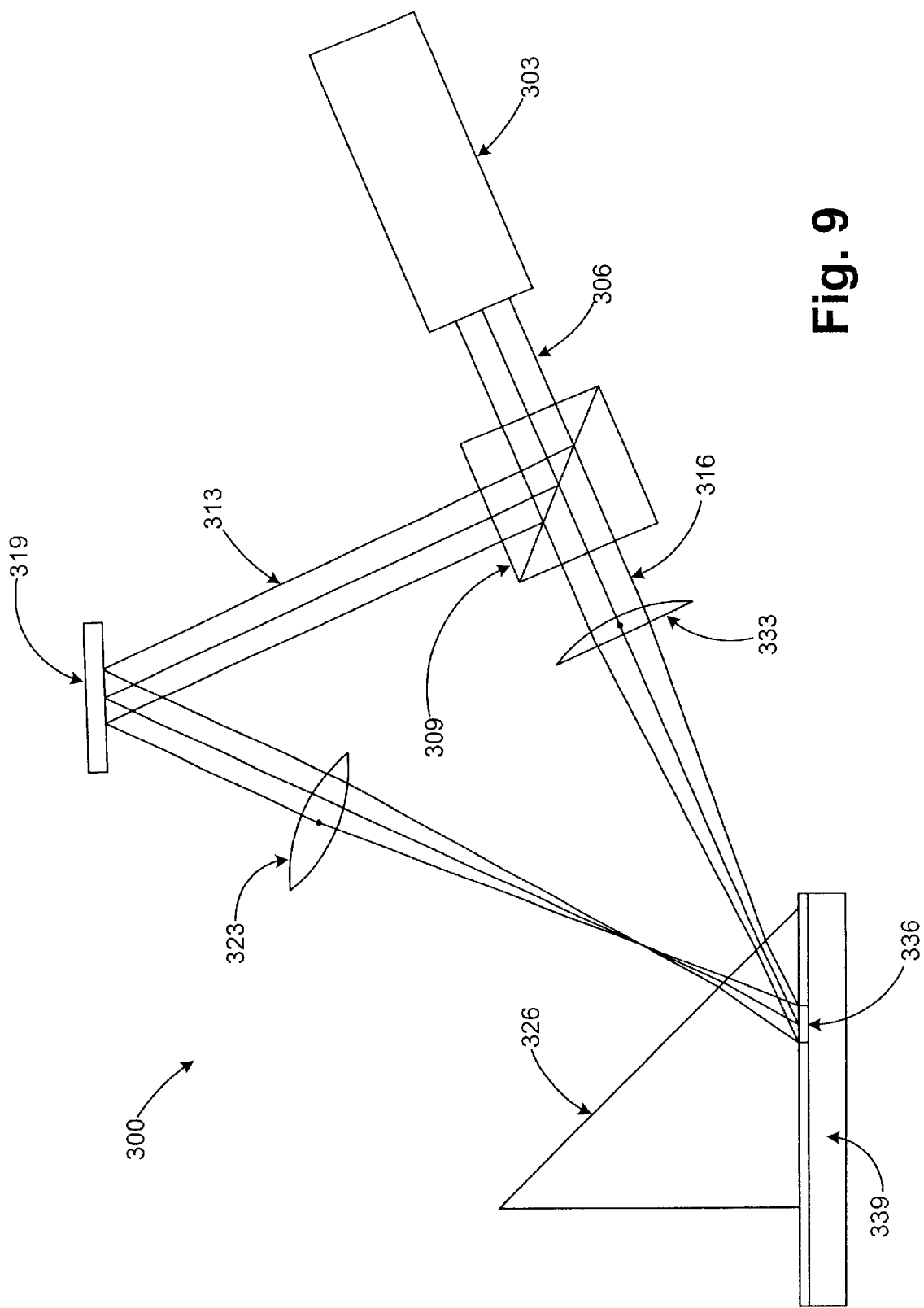
FIG. 9 is a drawing showing a volume grating fabrication system for creating the volume grating used in the optical couplers FIGS. 1A and 1B.

Referring to FIG. 9, shown is a recording system 300 according to an embodiment of the present invention. The recording system 300 comprises a laser 303 which emits a source laser beam 306. The source laser beam 306 is directed into a splitter 309, which splits the source laser beam 306 into a first laser beam 313 and a second laser beam 316, the first and second laser beams 313 and 316 being mutually coherent. A mirror 319 directs the first laser beam 313 into a first lens 323 and onto an optical coupling component 326. The second laser beam 316 propagates straight through the splitter 309 into a second lens 333 and onto the optical coupling component 326. The optical coupling component 326 may be, for example, a prism or other optical coupling device. The optical coupling component 326 optically couples the first and second laser beams 313 and 316 into a recording material 336 which, for example, rests on a substrate 339. The recording material 336 may be, for example, a high index recording material such as a photorefractive crystal material or an organic volume phase holographic material, or other suitable material known in the art. An optical coupling solution (not shown) may be employed between the optical coupling component 326 and the recording material 336 to facilitate the optical coupling of the first and second laser beams 313 and 316 from the optical coupling component 326 to the recording material 336.

Together the first and second lenses 323 and 333 with the optical coupling component 326 create an interference pattern at the position of the recording material 336 that is similar to the grating pattern discussed with reference to FIGS. 2, 3, and 4 above. The precise shape, focal length, and positioning of the first and second lenses 323 and 333 to achieve this interference pattern is determined as discussed in later text. In this example, the first lens 323 has an increased positive spherical aberration, and the second lens 333 has a minimized positive spherical aberration, although other lens configurations may be employed. Using the recording system 300 with ultraviolet light or other suitable wavelength, the volume grating of FIGS. 2, 3, and 4 above is created by subjecting the recording material 336 to the interference pattern as shown. Thereafter, the recording material 336 is subjected to uniform ultraviolet light to ensure that all polymers in the recording material 336 are cross-linked in the exposed recording material 336.

Figure 10:
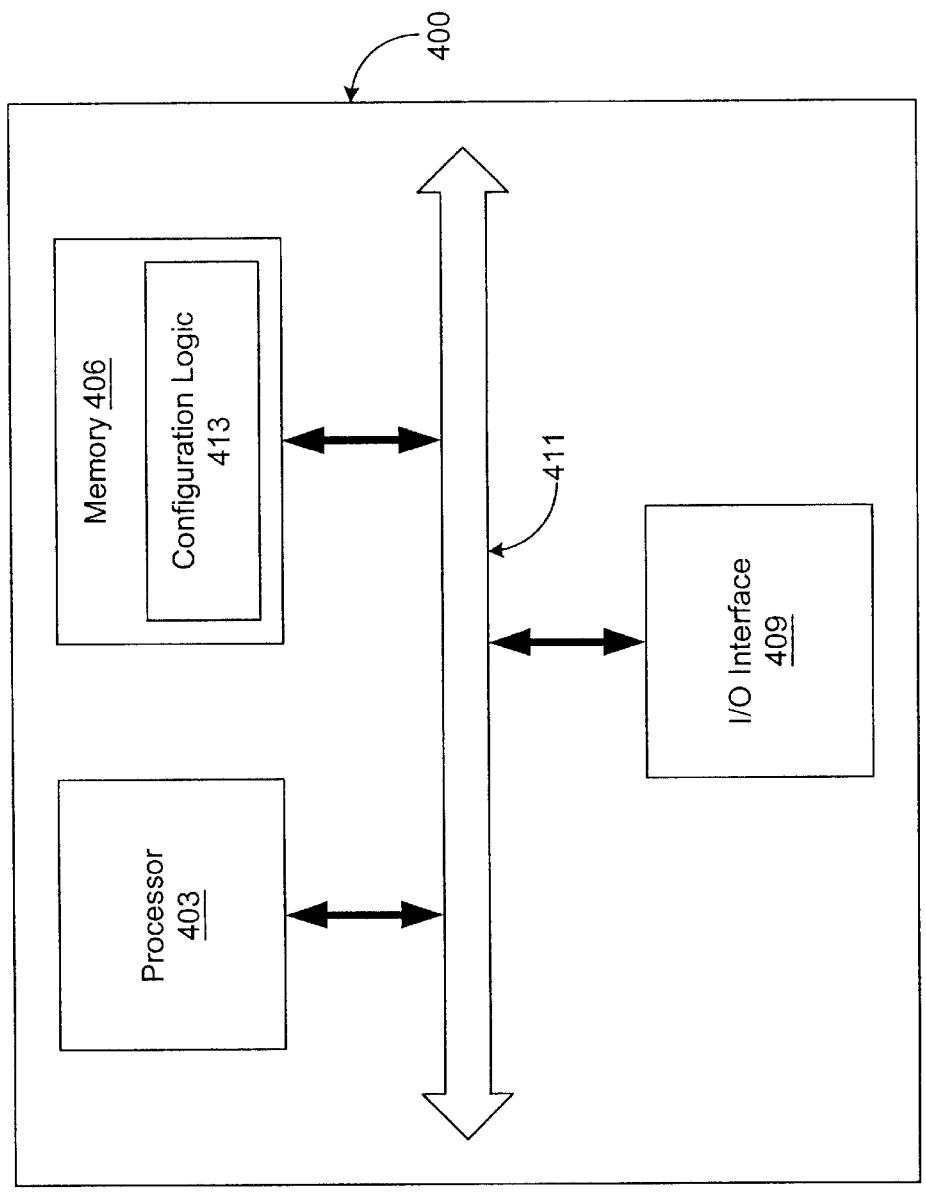
FIG. 10 is a block diagram showing a design system for designing the volume grating fabrication system of FIG. 9.

Turning to FIG. 10a shown is a lens configuration system 400 which determines the configuration of the first and second lenses 323 and 333 according to an embodiment of the present invention. The lens configuration system 400 is comprised of a standard computer which includes a processor 403, memory 406, and an input/output (I/O) interface 409. The processor 403, memory 406, and an input/output interface 409 are all coupled to a common data bus 411. The I/O interface 409 may be electrically coupled to any one of a number of peripheral equipment (not shown) such as a keyboard, display, printer, or other device. Multiple I/O interfaces 409 may be employed to couple multiple peripheral devices. Stored on the memory 406 is lens configuration logic 413 for determining the precise shape, focal length, and positioning of the first and second lenses 323 and 333 according to an embodiment of the present invention.

Figure 11:
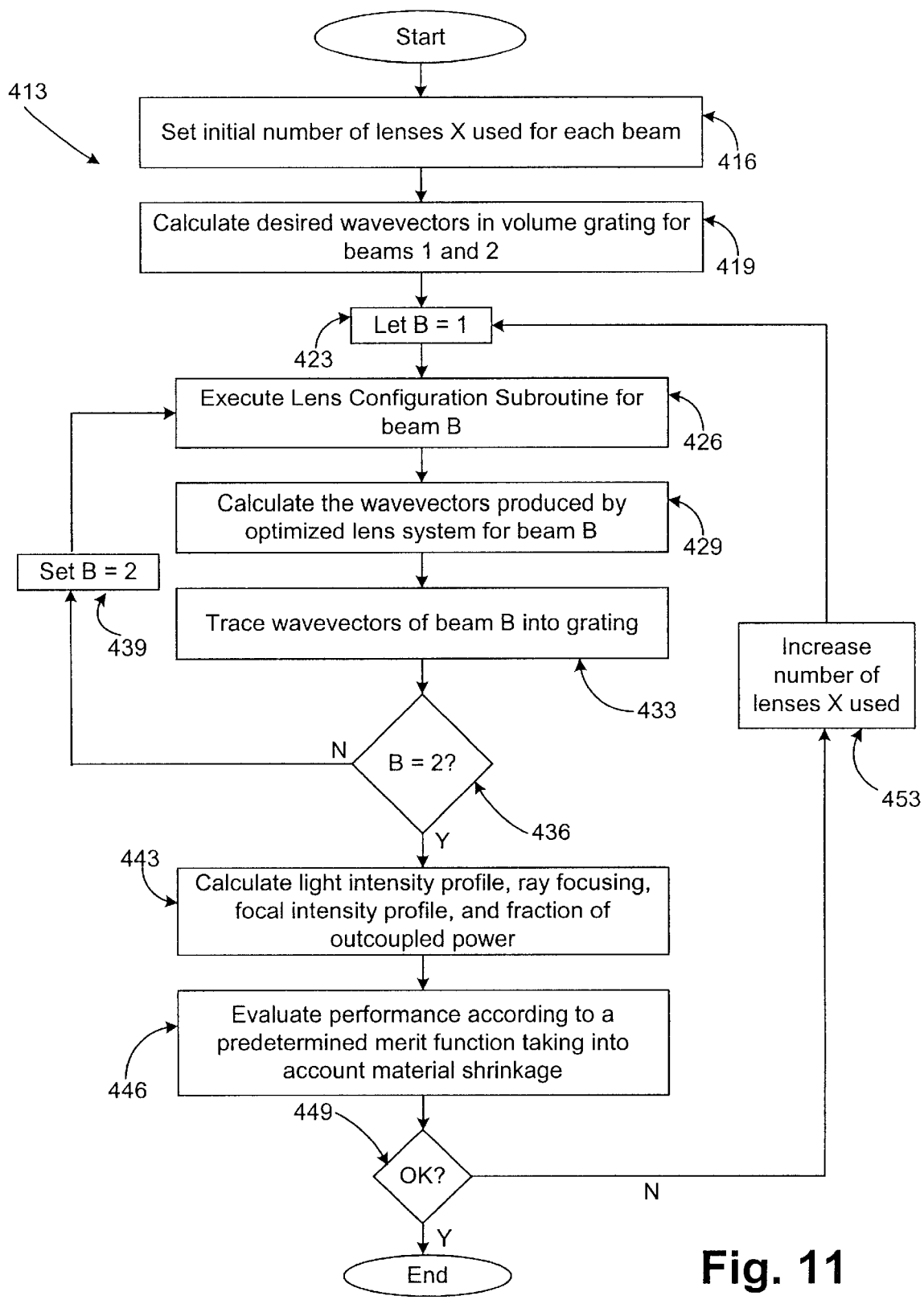
FIG. 11 is a flow chart showing a configuration logic employed by the design system of FIG. 10.

Referring next to FIG. 11, shown is a flow chart which depicts the configuration logic 413. Beginning with block 416, an initial number of lenses X to be used to condition the first and second laser beams 313 (FIG. 9) and 316 (FIG. 9) is set. Note the first and second lenses 323 (FIG. 9) and 333 (FIG. 9) each may actually comprise several lenses in a complex lens configuration. Next, in block 419, the desired wave vectors are calculated that create the desired interference pattern that result in the volume grating described in FIGS. 2, 3, 4, and 8 above. First, material shrinkage of the recording material 336 (FIG. 9) is compensated for by altering the desired volume grating vector $K_z$, where Kz=(Kz(1−Δ)), Δ being the percent change in the recording material thickness. These desired grating vectors $K_x$, $K_y$, and $K_z$, are plugged into the equations $$K_x = k_{x1} - k_{x2},$$

$$K_y = k_{y1} - k_{y2},$$

and $$K_z = k_{z1} - k_{z2}.$$

Given that $$k_{x1}^2 + k_{y1}^2 + k_{z1}^2 = (n_g k_0)^2,$$

and $$k_{x2}^2 + k_{y2}^2 + k_{z2}^2 = (n_g k_0)^2,$$

where $n_g$ is the average index of refraction of the volume grating, and $k_0$ is the wave number of free space ($k_0 = 2\pi\lambda$) where λ is the wavelength of the first and second laser beams 313 and 316, we have five equations and six unknowns, where $k_{x1}$, $k_{y1}$, and $k_{z1}$ are the components of the wavevector of the first laser beam 313, and $k_{x2}$, $k_{y2}$, and $k_{z2}$ are the components of the wavevector of the second laser beam 316. Note that the first and second laser beams 313 and 316 have a wavelength that is significantly shorter than the wavelength of the operating laser light 109 (FIGS. 1A and 1B). Setting $k_{y2}=0$, solve for $k_{x1}$, $k_{y1}$, $k_{z1}$, $k_{x2}$, and $k_{z2}$. These wave vectors determine the ultimate direction of the waves of the first and second laser beams 313 and 316.

The configuration logic 413 then progresses to block 423 in which the beam variable B is set equal to 1. Thereafter, the configuration logic 413 progresses to block 426 in which a lens configuration subroutine is executed on the current beam indicated by the beam variable B to determine a prospective lens configuration for the number of lenses X specified. The configuration logic 413 then moves to block 429 in which the actual wave vectors produced by the optimized lens system determined in block 426 are calculated. Then, in block 433, these wave vectors are traced into the volume grating.

In block 436, the beam variable B is examined to determine whether it has been cycled to the second beam, such that it equals 2. If not, then the configuration logic 413 cycles to block 439 in which the beam variable B is set equal to 2. Thereafter, the configuration logic reverts back to block 426. If in block 436 the beam variable is equal to 2, then the configuration logic progresses to block 443 in which the light intensity profile, ray focusing, focal intensity profile, and the fraction of the guided power which is outcoupled are calculated.

Next, in block 446, the light intensity profile, ray focusing, and other parameters are evaluated according to a predetermined merit function while compensating for recording material shrinkage during the exposure process. The compensation can be performed, for example, using the equation $K_Z = K_Z(1-\Delta)$, where $\Delta$ is defined as the percent change in the recording material thickness. Thereafter, in block 449, if the evaluation of block 446 proves the lens configuration satisfactory, then the configuration logic 413 ends. If, on the other hand, the evaluation of block 446 proves the lens configuration unsatisfactory, then the configuration logic 413 progresses to block 453 where the number of lenses X employed is increased for greater accuracy. Thereafter, the configuration logic 413 reverts back to block 423.

Figure 12:
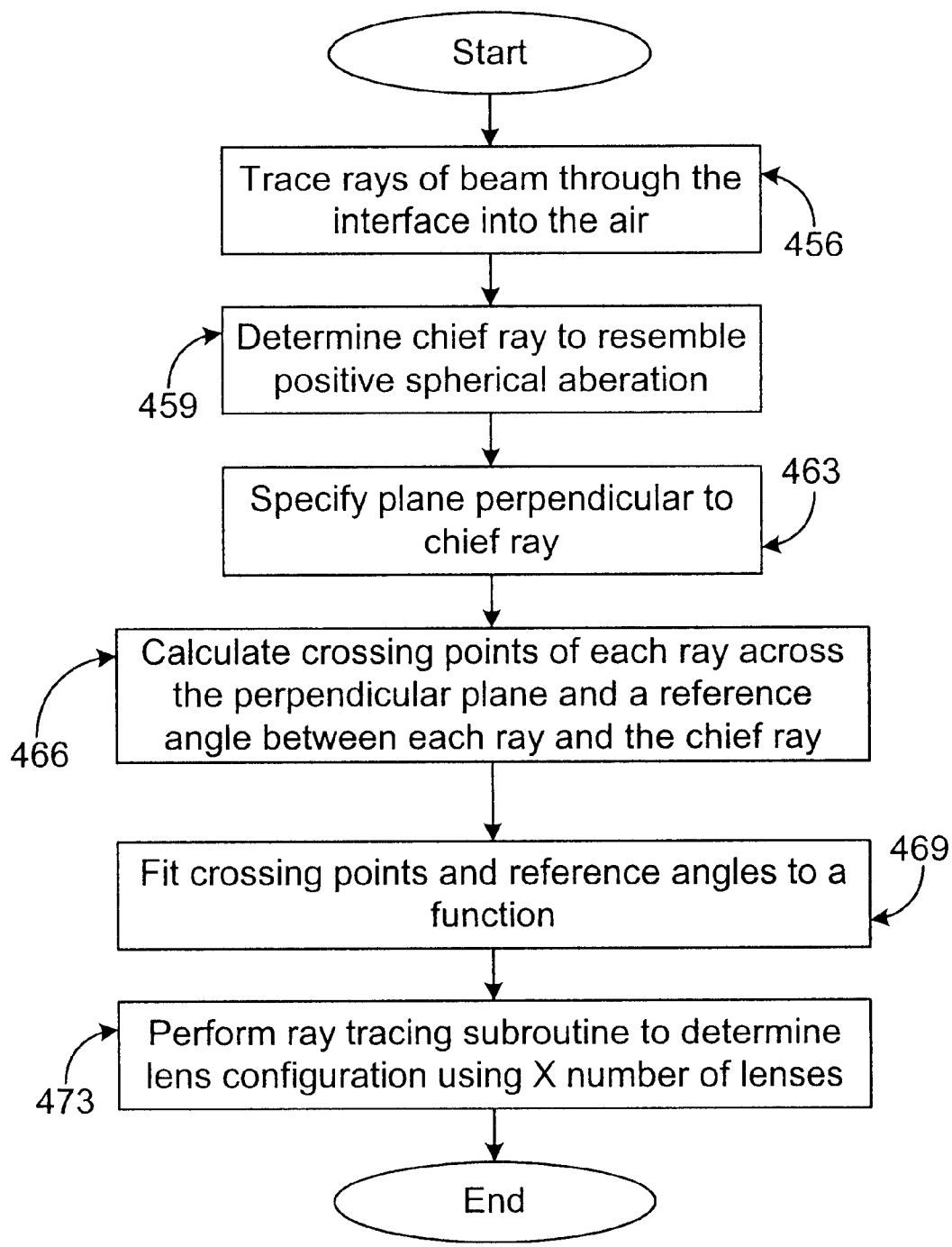
FIG. 12 is a flow chart showing a lens configuration subroutine employed by the configuration logic of FIG. 11.

Referring next, to FIG. 12, shown is a flow chart of the lens configuration subroutine 426. Beginning with block 456, the desired wave vectors calculated in block 419 for the laser beam B are traced through the optical coupling component 326 (FIG. 9) into the air. Generally, these rays will converge but will not cross each other at the same point. This non-perfect focusing is called optical aberration. It is observed that positive spherical aberration is the easiest type of aberration to create with lenses and other optical components. For converging waves, positive spherical aberration will cause rays which are a greater radial distance away from a predefined chief ray to cross the chief ray at a point proportionately closer to the lens creating such aberration. Accordingly, in block 459, a chief ray is chosen based on the desired wave vectors calculated in block 419.

Next, in block 463, a plane is specified that is perpendicular to the chief ray chosen in block 459. The lens configuration subroutine 426 then progresses to block 466 in which the crossing points of each ray through the specified perpendicular plane are determined along with a reference angle made between each individual ray and the chief ray. In block 469, these crossing points and reference angles are fitted to a function according to the equations $$_{x1}(x, y) = g_1(x, y)$$

and $$_{y1}(x, y) = g_2(x, y),$$

where $_{x1}(x, y)$ is defined as the angle determined between the rays and the chief ray that is parallel to the x axis of the perpendicular plane, $_{y1}(x, y)$ is defined as the angle determined between the rays and the chief ray that is parallel to the y axis of the perpendicular plane, $g_1(x, y)$ is a function approximating $_{x1}(x, y)$, and $g_2(x, y)$ is a function approximating $_{y1}(x, y)$. Finally, in block 473, a ray tracing subroutine is executed based on the functions $g_1(x, y)$ and $g_2(x, y)$ to determine the lens configuration using the number of lenses X specified. The ray tracing subroutine is similar to those commercially available as known by those skilled in the art, and consequently, will not be discussed in detail herein.

Many variations and modifications may be made to the preferred embodiment of the invention without departing substantially from the spirit and principles of the invention. All such modifications and variations are intended to be included herein within the scope of the present invention, as defined by the following claims.

Having thus described the invention, it is claimed:

1. A volume grating for use in an optical coupler, comprising:
   a predetermined surface grating pattern having a surface grating period decreasing along a waveguide light propagation direction in the volume grating; and
   a plurality of slanted grating fringes having a variable slant angle along the waveguide light propagation direction.

2. The volume grating of claim 1, wherein the predetermined surface grating pattern further includes an increasing radius of curvature along the waveguide light propagation direction.

3. The volume grating of claim 2, wherein a light intensity profile at an output plane of the volume grating corresponds to the predetermined variable slant angle.

4. The volume grating of claim 3, further comprising a preferential-order.

5. The volume grating of claim 3, wherein the predetermined preferential light intensity profile is a Gaussian profile.

6. The volume grating of claim 1, wherein said volume grating is formed from a photorefractive crystal material.

7. The volume grating of claim 1, wherein said volume grating is formed from an organic volume holographic material.

8. The volume grating of claim 1, wherein a light intensity profile at an output plane of the volume grating corresponds to the predetermined variable slant angle.

9. The volume grating of claim 8, wherein the predetermined light intensity profile propagates in a preferential order.

10. The volume grating of claim 8, wherein the predetermined light intensity profile is a Guassian profile.

11. The volume grating of claim 1, wherein a light intensity profile corresponds to predetermined slant angles which vary along the waveguide light propagation direction of the volume grating.

12. The volume grating of claim 1, wherein the resultant light intensity profile at an output plane of the volume grating corresponds to a predetermined variable slant angle.

13. The volume grating of claim 1, wherein the orientation of each one of the plurality of slanted grating fringes within the volume grating is defined by a slant angle, said slant angles varying in degree along the waveguide light propagation direction.

14. The volume grating of claim 13, wherein the slant angle of each one of the plurality of grating fringes decreases along the waveguide light propagation direction.

15. The volume grating of claim 13, wherein the slant angle of each one of the plurality of grating fringes increase along the waveguide light propagation direction.

16. The volume grating of claim 13, wherein the slant angle of each one of the plurality of grating fringes is variably differentiated with respect to other slant angles along the waveguide light propagation direction.

17. The volume grating of claim 1, wherein the orientation of each one of the plurality of slanted grating fringes within the volume grating is defined by a slant angle, said slant angles varying between a leading edge and a trailing edge of the volume grating.

18. The volume grating of claim 17, wherein the slant angle of each one of the plurality of grating fringes decreases between a leading edge and a trailing edge of the volume grating.

19. The volume grating of claim 17, wherein the slant angle of each one of a plurality of grating fringes increases between a leading edge and a trailing edge of the volume grating.

20. The volume grating of claim 17, wherein the slant angle of each one of the plurality of grating fringes is variably differentiated with respect to other slant angles along the waveguide light propagation direction.

21. A volume grating for use in an optical coupler, comprising:
   first means for variably altering the propagation of a guided wave according to a preferential order;
   second means for focusing light in a first dimension;
   third means for focusing light in a second dimension; and
   fourth means for causing a predetermined light intensity profile at an output plane of the volume grating.

22. The volume grating of claim 21, wherein the first means further comprises a plurality of slanted grated fringes in the volume grating.

23. The volume grating of claim 21, wherein the second means further comprises a predetermined surface grating pattern having a decreasing surface grating period along a waveguide light propagation direction in the volume grating.

24. The volume grating of claim 21, wherein the third means further comprises a predetermined surface grating pattern having an increasing radius of curvature along the waveguide light propagation direction.

25. The volume grating of claim 21, wherein said fourth means further comprises a plurality of slanted grating fringes having a variable slant angle along the waveguide light propagation direction.

26. A method for coupling light from a waveguide to a focused point, comprising the steps of:
   directing a laser light beam into a waveguide having a volume grating;
   coupling the laser light with a plurality of slanted grating fringes having a variable slant angle along a waveguide light propagation direction; and
   focusing the laser light with a predetermined surface grating pattern having a decreasing surface grating period along the waveguide light propagation direction in the volume grating.

27. The method claim 26, further comprising the step of focusing the laser light with fringes having an increasing radius of curvature along the waveguide light propagation direction in the predetermined surface grating pattern.

28. The method of claim 26, further comprising the step of configuring the variable slant angle to provide a predetermined light intensity profile at an output plane of the volume grating.

29. A collimating volume grating for use in an optical coupler, comprising:
   a predetermined surface grating pattern having an even surface grating period; and
   a plurality of slanted grating fringes having a variable slant angle along the waveguide light propagation direction.

30. A surface relief grating for use in an optical coupler, comprising:
   a waveguide;
   a predetermined number of separated grating ridges disposed in the waveguide, the separated grating ridges forming a predetermined surface grating pattern having a decreasing surface grating period along a waveguide light propagation direction; and
   the separated grating ridges having a variable slant angle along the waveguide light propagation direction.

31. The surface relief grating of claim 30, wherein the predetermined surface grating pattern further includes an increasing radius of curvature along the waveguide light propagation direction.

32. A volume grating for use in an optical coupler, comprising:
   a first means for focusing a laser light with a plurality of slanted grating fringes, with each one of said plurality of slanted grating fringes having a predefined variable slant angle along a waveguide light propagation direction; and
   a second means for configuring a predetermined light intensity profile at an output plane of the volume grating.

33. The volume grating of claim 32, wherein the first means further comprises a predetermined surface grating pattern having a decreasing surface grating period along the waveguide light propagation direction.

34. The volume grating of claim 32, wherein the first means comprises a predetermined surface grating pattern having an increasing radius of curvature along the waveguide light propagation direction.

35. An optical coupler for use in optical communications systems which comprises:
   a volume grating having a predetermined surface grating pattern; and
   a plurality of variably slanted grating fringes along said volume grating.

36. The optical coupler of claim 35, wherein the predetermined surface grating pattern of the volume grating has a surface grating period that decreases along a waveguide light propagation direction.

37. The optical coupler of claim 35, wherein the predetermined surface grating pattern of the volume grating has an increasing radius of curvature along a waveguide light propagation direction.

38. The optical coupler of claim 35, wherein the variably slanted grating fringes of the volume grating have a corresponding variable slant angle along a waveguide light propagation direction.

39. An optical communication system, comprising:
   an optical fiber;
   an optical circuit;
   a transmitter;
   a receiver; and
   an optical coupler; said optical coupler further comprising a volume grating having a plurality of variably slanted grating fringes along a waveguide light propagation direction.

40. The volume grating of claim 39, wherein the volume grating has a predetermined surface grating pattern.

41. The volume grating of claim 40, wherein the predetermined surface grating pattern has a surface grating period that decreases along the waveguide light propagation direction.

42. The volume grating of claim 40, wherein the predetermined surface grating pattern has a surface grating period that increases along the waveguide light propagation direction.

43. The volume grating of claim 40, wherein the predetermined surface grating pattern of the volume grating has an increasing radius of curvature along the waveguide light propagation direction.

44. The volume grating of claim 39, wherein the variably slanted grating fringes of the volume grating have a corresponding variable slant angle along the waveguide light propagation direction.

45. A volume grating for use in an optical coupler, comprising:

a predetermined surface grating pattern having a surface grating period decreasing along a waveguide light propagation direction in the volume grating;

a plurality of slanted grating fringes having a variable slant angle along the waveguide light propagation direction; and wherein the predetermined surface grating pattern further includes an increasing radius of curvature along the waveguide light propagation direction.

46. The volume grating of claim 45, wherein a light intensity profile at an output plane of the volume grating corresponds to the predetermined variable slant angle.

47. The volume grating of claim 46, further comprising a preferential order.

48. The volume grating of claim 46, wherein the predetermined preferential light intensity profile is a Guassian profile.

49. A volume grating for use in an optical coupler, comprising:

a predetermined surface grating pattern having a surface grating period decreasing along a waveguide light propagation direction in the volume grating;

a plurality of slanted grating fringes having a variable slant angle along the waveguide light propagation direction;

wherein the variable slant angle is configured to provide a predetermined light intensity profile at an output plane of the volume; and wherein the predetermined light intensity profile propagates into a preferential order.

50. A method for coupling light from a waveguide to a focused point, comprising the steps of:

directing a laser light beam into a waveguide having a volume grating;

coupling the laser light with a plurality of slanted grating fringes having a variable slant angle along a waveguide light propagation direction;

focusing the laser light with a predetermined surface grating pattern having a decreasing surface grating period along the waveguide light propagation direction; and focusing the laser light with fringes having an increasing radius of curvature along the waveguide light propagation direction in the predetermined surface grating pattern.

51. An optical coupler for use in optical communications systems which comprises:

a volume grating having a predetermined surface grating pattern;

a plurality of variably slanted grating fringes along said volume grating; and wherein the predetermined surface grating pattern of the volume grating has an increasing radius of curvature along a waveguide light propagation direction.

52. An optical communication system, comprising:

an optical fiber;

an optical circuit;

a transmitter;

a receiver;

an optical coupler, said optical coupler further comprising a volume grating having a plurality of variably slanted grating fringes along a waveguide light propagation direction;

wherein the volume grating has a predetermined surface grating pattern; and wherein the predetermined surface grating pattern of the volume grating has an increasing radius of curvature along the waveguide light propagation direction.

* * * * *